Feb. 26, 1963   J. D. CONFELD ETAL   3,079,590
DATA HANDLING SYSTEM
Filed Nov. 20, 1959   7 Sheets-Sheet 6

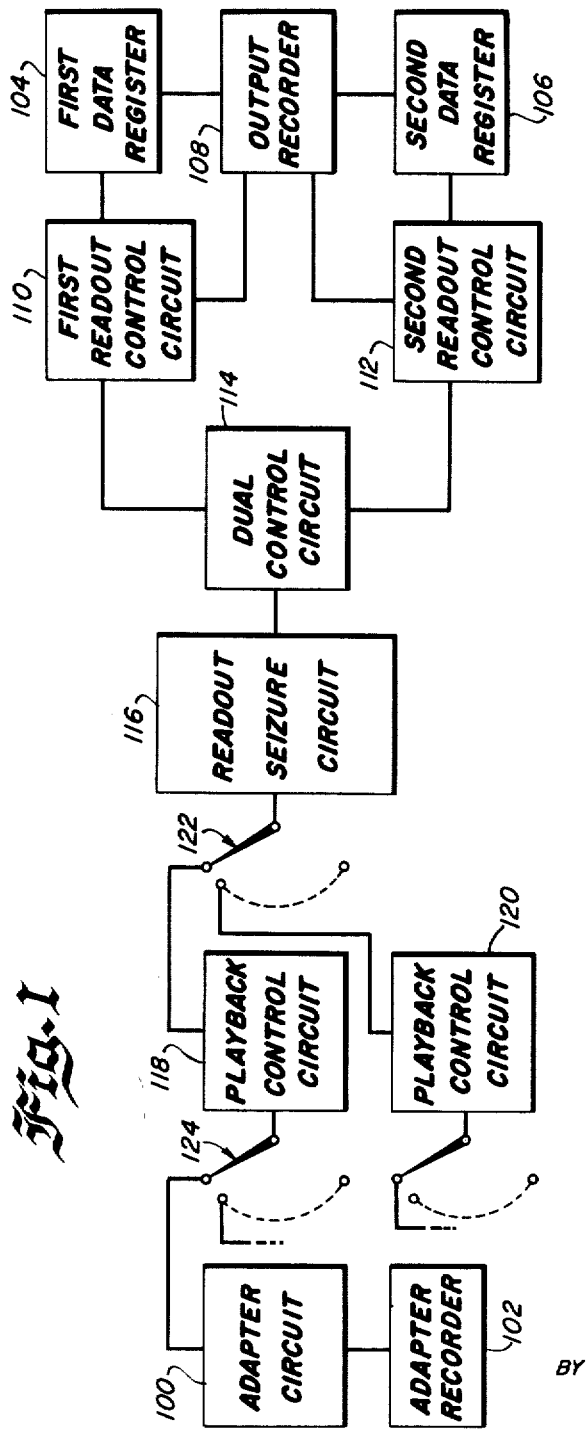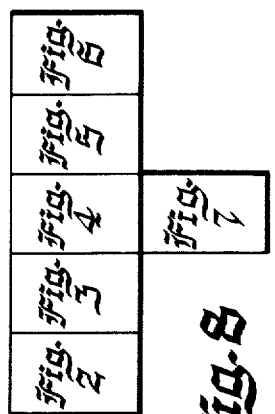

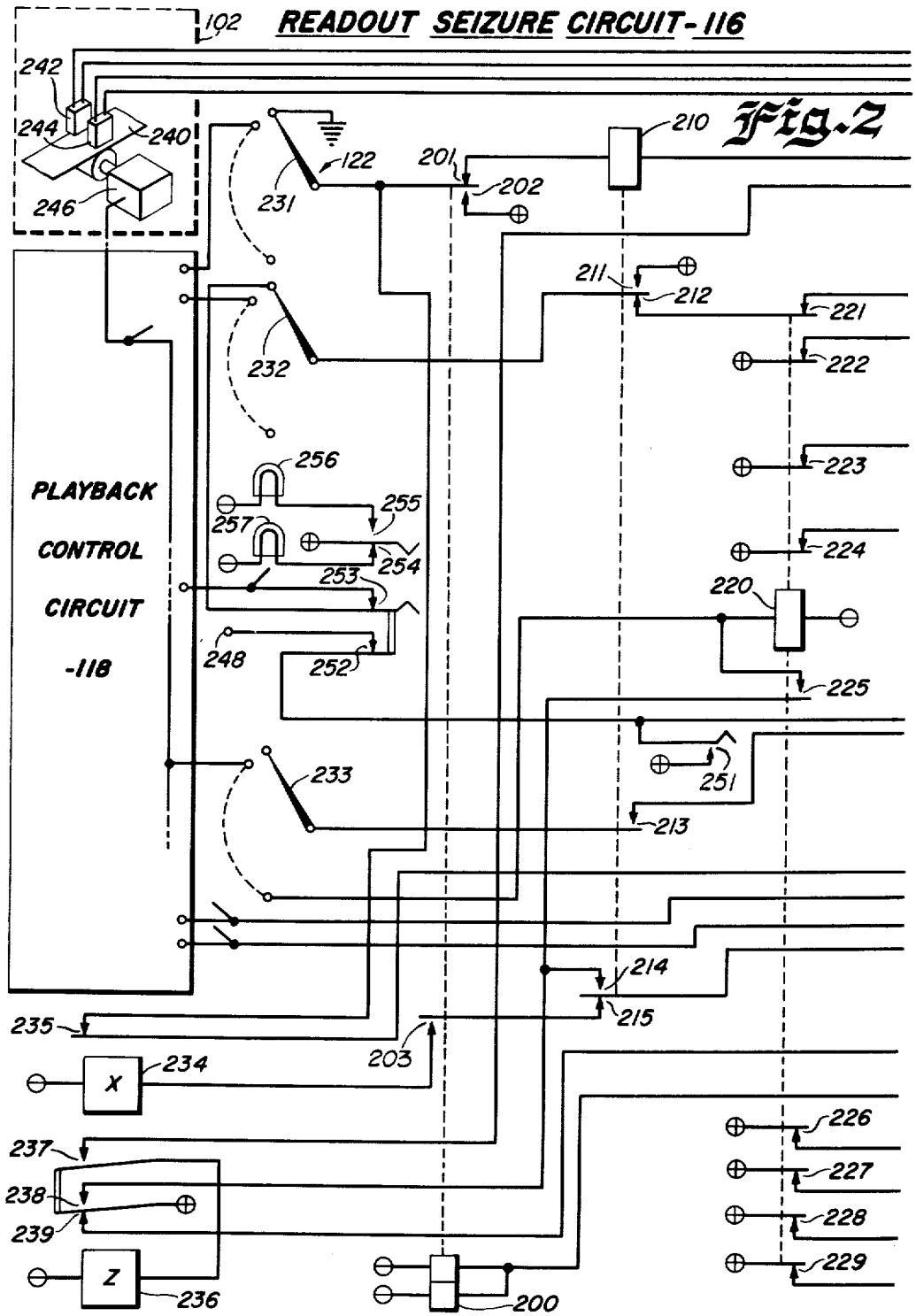

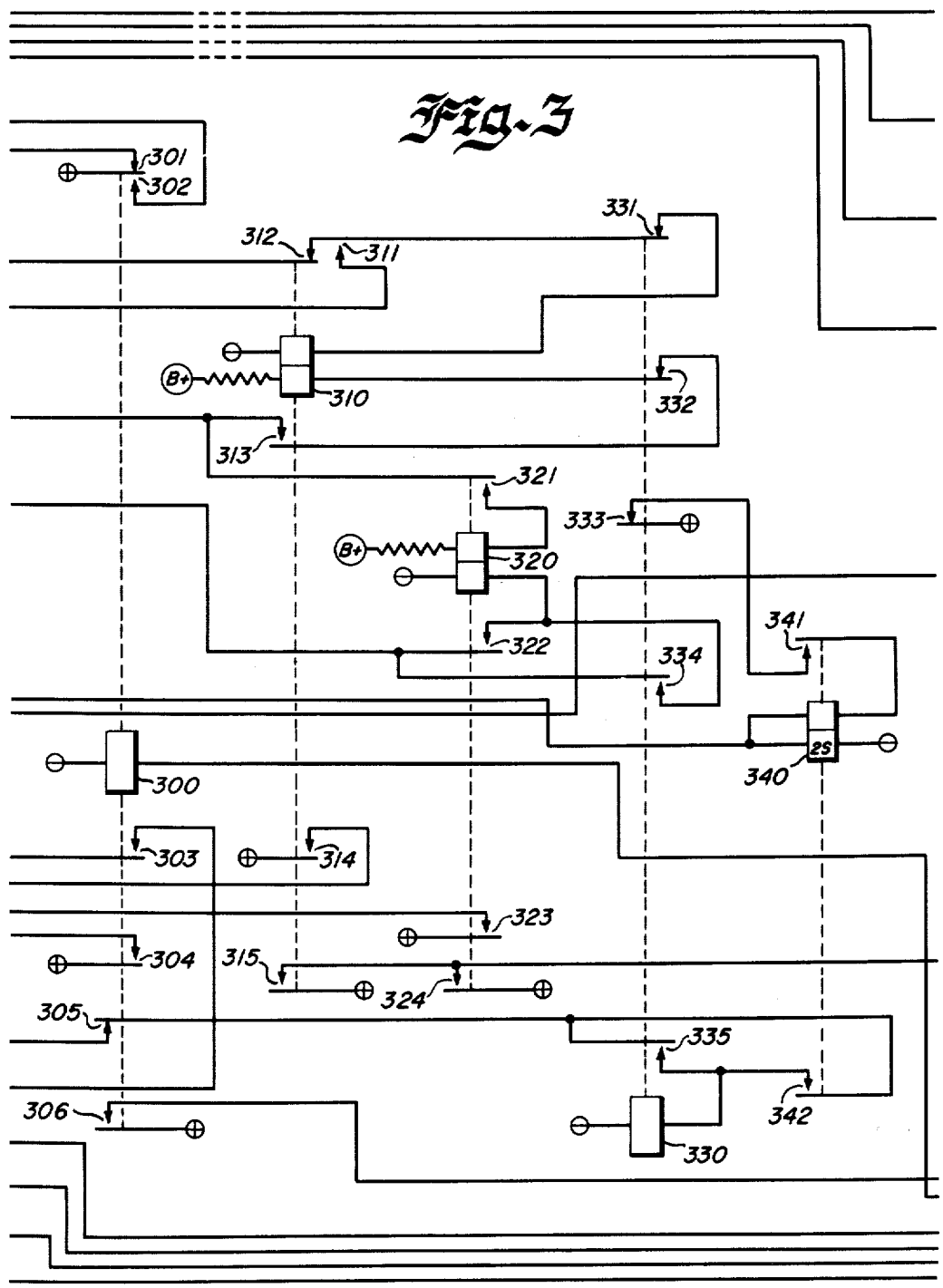

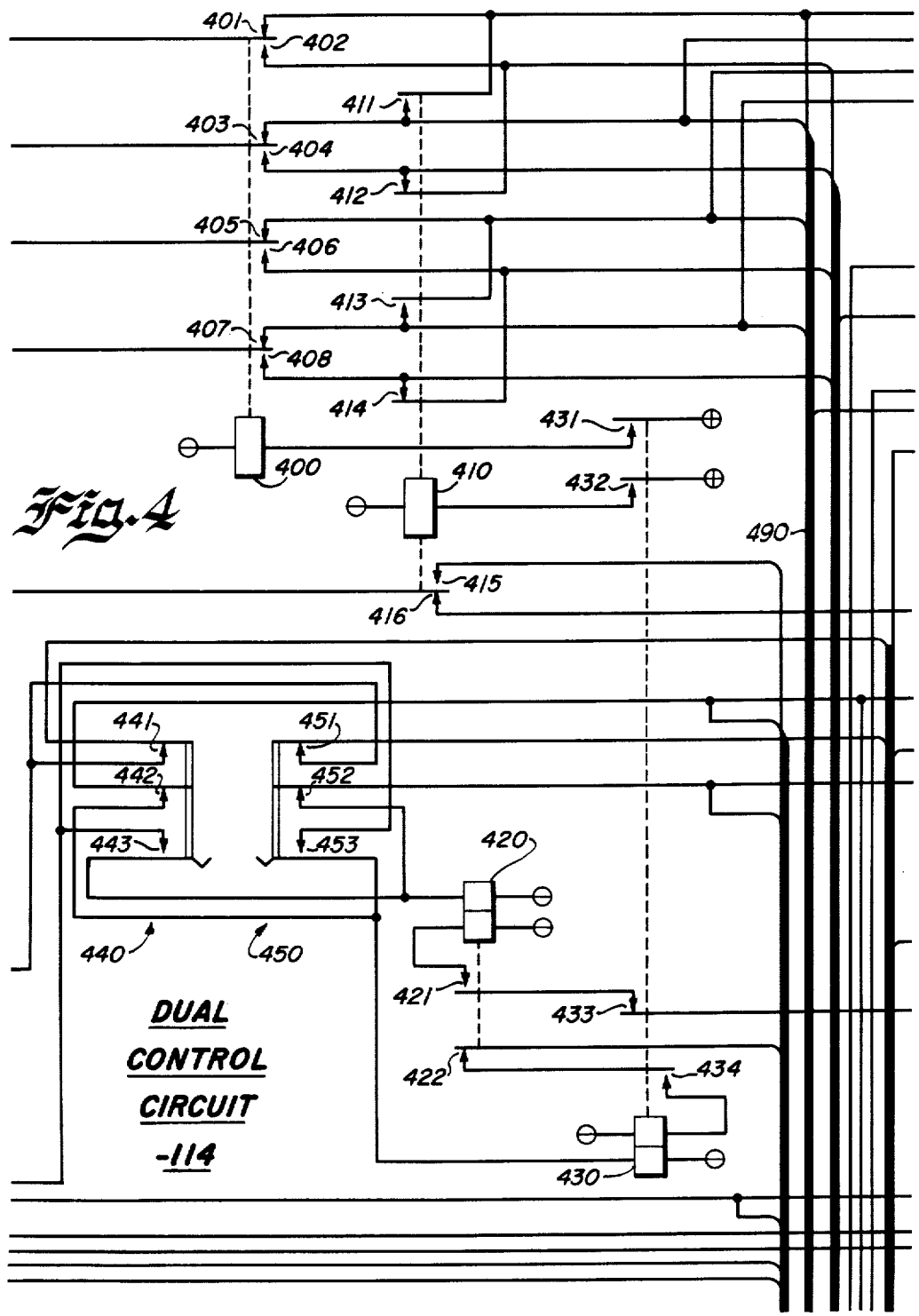

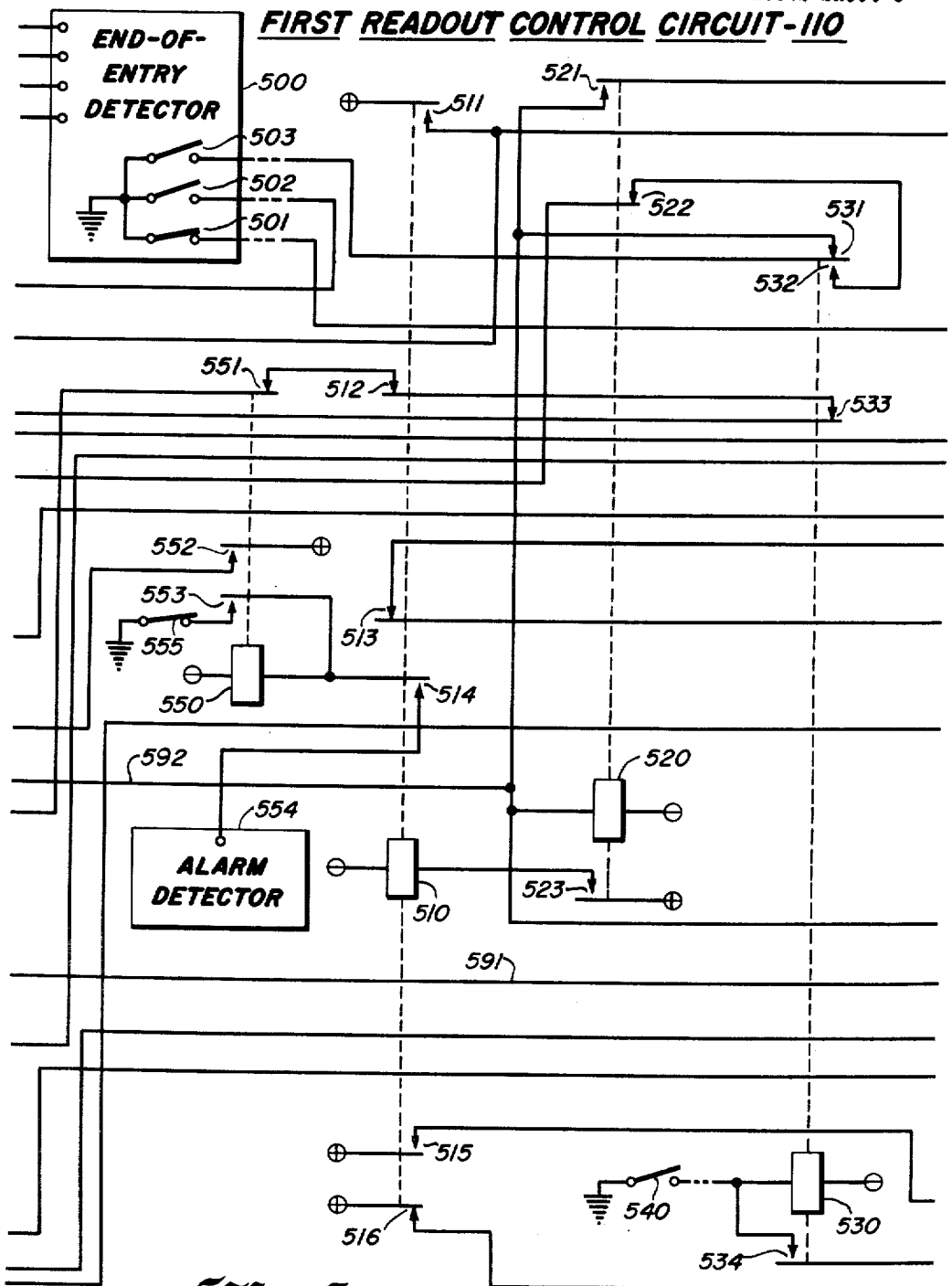

FIRST READOUT CONTROL CIRCUIT-110

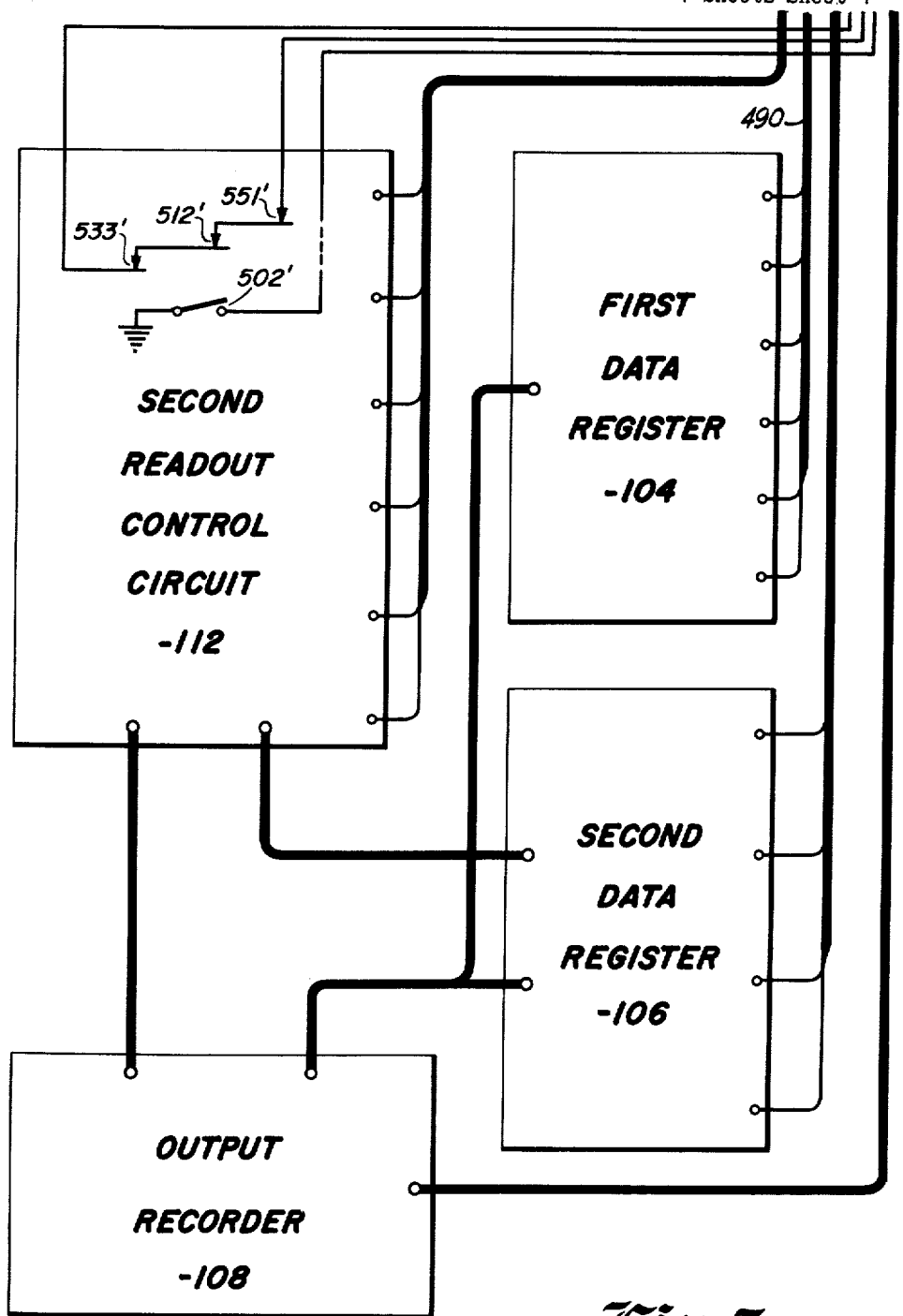

3,079,590
DATA HANDLING SYSTEM
James D. Confeld, Rochester, N.Y., and Robert K. Kaye, Medford Lakes, N.J., assignors to General Dynamics Corporation, Rochester, N.Y., a corporation of Delaware
Filed Nov. 20, 1959, Ser. No. 854,463
1 Claim. (Cl. 340—172.5)

This invention relates to a data handling system and, more particularly, to an automatic toll ticketing or accounting system including new and improved means for storing and recording toll call data.

Automatic toll ticketing or accounting systems generally comprise data collecting and storing means operable during the extension of a call for automatically collecting data pertaining to the call and for storing this data on a record medium. In many systems, the record medium on which the toll call data is stored is placed in separate data translating and computing equipment which produces a final output record. In other arrangements, the record medium is played back either at the end of each call or at selected time intervals, as in the system shown and described in United States Patent No. 2,877,311. In all of these systems, it is desirable to reduce the time required for the playback or output recording operation in order to reduce the amount of relatively expansive common readout equipment needed to handle a given volume of data. In systems of the type shown in the above identified patent, it is particularly desirable to reduce the playback time because the data is stored in recorders connected to line extending means, such as trunk circuits, and these line extending means are busied out of service during the playback or output recording operation.

Accordingly, one object of the present invention is to provide a new and improved data handling system.

Another object is to provide an automatic toll ticketing or accounting system including new and improved means for transferring and storing data.

A further object is to provide a data handling system in which data entries are stored in alternate data registers which are alternately rendered effective to control a common output device.

Another object is to provide a data handling system in which a pair of data registers are alternatively rendered effective to store successive data entries received from a common data source.

Another object is to provide a data handling system including a plurality of data registers that are rendered effective to store data from a source in one time sequence and are concurrently rendered effective to control a common data utilizing means in another and different time sequence.

Another object is to provide a data handling system including means for selectively transferring the control over data transmission from a source to a plurality of registers for receiving and storing the transmitted data.

In accordance with these and many other objects, an embodiment of the present invention comprises an automatic toll ticketing system including a plurality of trunk or adapter circuits that are used in extending toll connections between calling and called communication circuits. An adapter or trunk recorder connected to each of these line extending means is automatically rendered effective during the extension of a call to collect and store items of information on an endless loop of magnetic tape therein. At the conclusion of the items of information relating to a single toll call, which items form a single data entry, an end-of-call or end-of-entry signal is recorded on the magnetic tape. In a system of the type disclosed in the above identified patent, the data recording operations take place over an extended period of time, such as a day, so that the loop of magnetic tape in each adapter or trunk recorder includes a plurality of successive data entries, each consisting of the items of information pertaining to a toll call and each followed by an end-of-call or end-of-entry signal.

When the data stored in the adapter recorders is to be played back, readout equipment common to the plurality of trunk recorders is placed in operation to seize each of the adapter or trunk recorders in sequence. The common readout equipment includes two identical data registers including data storing, translating and computing means and a control circuit individual to each of the data registers. The outputs of the two data registers are connected to a common output recorder. The data registers are connected through a dual control circuit to a readout seizure circuit that includes switching means for seizing each of a plurality of playback control circuits in sequence. Each of the playback control circuits, in turn, has access to a plurality of trunk or adapter circuits and the connected recorders.

When a data recording or playback operation is initiated, the readout seizure circuit seizes a playback control circuit, and switching means in the playback control circuit seizes an idle adapter circuit and the adapter recorder connected thereto. At this time, the first readout control circuit forwards a signal to the seized adapter recorder to render this recorder effective to transmit a single data entry, i.e., the items pertaining to a single toll call, to the first data register for storage therein. When the end-of-entry signal at the end of the first data entry is received, a detecting means in the first readout control circuit interrupts the operating circuit for the adapter recorder to prevent the transmission of additional data to the first register, renders the first register effective to control the output recorder, and transfers control over the seized adapter recorder to the second readout control circuits. If the second data register is in a reset condition, the second readout control circuit operates the seized adapter recorder to transmit the second data entry to the second register. This second data entry is stored in the second data register concurrently with the transfer of the first data entry from the first data register to the output recorder. When the end-of-entry signal following the second data entry is received by the second readout control circuit, the operating circuit for the adapter recorder is again interrupted to prevent the transmission of the third data entry, the second data register is rendered effective to control the common output recorder, and the control over the operation of the seized adapter recorder is returned to the first readout control circuit. If the first data register has been cleared following the transfer of the first data entry to the output recorder, the first readout control circuit returns an operating signal to the adapter recorder.

This alternative operation continues until such time as all of the items of information stored in the seized adapter recorder have been played back. At this time, the playback control circuit operates to seize the remaining adapter circuits to which it has access and causes the playback of this information to the first and second data registers and the common output recorder. At the completion of the playback of the adapter recorders to which the first playback control circuit has access, the readout seizure circuit releases the first playback control circuit and seizes the next playback control circuit. The adapter recorders to which the second playback control circuit has access are then played back in the manner described above. At the conclusion of the recording of all of the data entries stored in all of the adapter recorders, the common readout equipment is restored to a normal condition. Because of the concurrent transmission of a data entry from an adapter recorder to one of the data registers during the time interval in which the other data register is transferring a previously stored data entry to the output recorder, the time required to produce final or output records of the stored information is materially reduced.

Many other objects and advantages of the present invention will become apparent from considering the following detailed description in conjunction with the drawings in which:

FIG. 1 is a block diagram of an automatic toll ticketing system embodying the present invention;

FIGS. 2–7 are schematic circuit diagrams of the automatic toll ticketing system shown in FIG. 1; and FIG. 8 is a block diagram illustrating the manner in which FIGS. 2–7 of the drawings are positioned adjacent each other to form a complete circuit diagram of an automatic toll ticketing system embodying the present invention.

Figure 6:
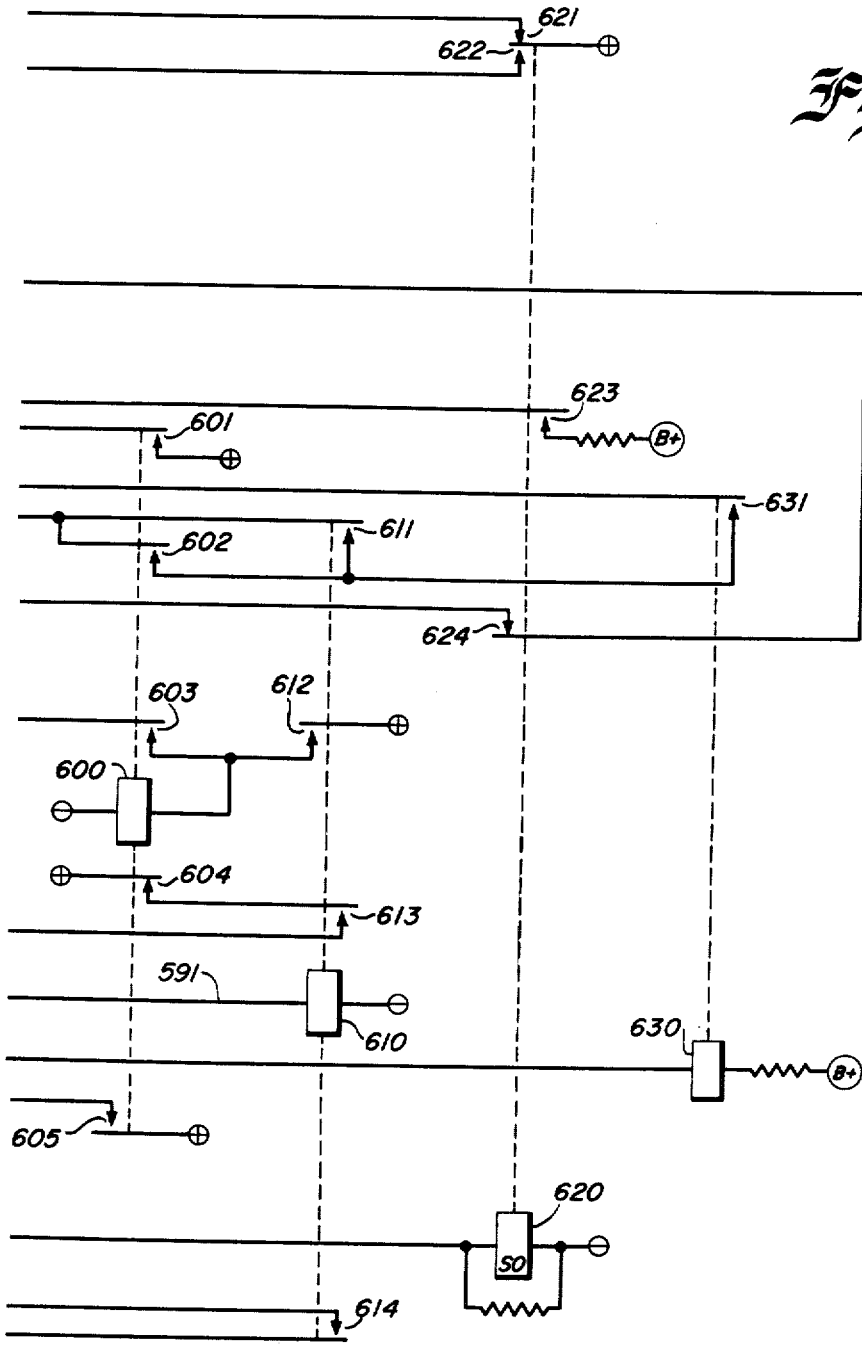

Referring now more specifically to FIG. 1 of the drawings, the automatic toll ticketing system illustrated in block form therein is of the same general type described in detail in the above identified patent and includes a plurality of adapter or trunk circuits 100 to each of which an individual adapter recorder 102 is connected. The adapter circuits 100 are used in extending calls between calling and called communication circuits and include control circuits for storing items of information pertaining to each tool call on an endless loop of magnetic tape in the adapter recorder 102 to form a data entry. At the completion of the recording of each of the items of information pertaining to the call, an end-of-call or end-of-entry signal is stored in the adapter recorder 102. Since the information is played back or removed from the adapter recorders 102 only at selected intervals, each of the loops of tape therein stores a plurality of successive data entries separated by end-of-entry signals.

When the items of information stored in the adapter recorders 102 are to be recorded in permanent form, readout equipment common to the plurality of adapter recorders 102 is used. This common readout equipment includes first and second data registers 104 and 106, the outputs of which are connected to a common output recorder 108. The data registers 104 and 106 are each connected to one of two readout control circuits 110 and 112 which are also connected to the output recorder 108 and a dual control circuit 114, the input of which is connected to a readout seizure circuit 116. To provide means for selecting each of the adapter recorders 102 for playback in sequence, a plurality of playback control circuits 118 and 120 are provided.

When the readout operation is to be initiated, the readout seizure circuit 116 is placed in operation so that a switching means 122 forming a part thereof is operated to select the first playback control circuit 118. The seizure of the control circuit 118 causes the operation of a switching means 124 to seize an idle adapter circuit 100 and the adapter recorder 102 connected thereto. When the adapter recorder is seized, an operating signal for rendering this recorder effective to transmit the first data entry stored therein is forwarded from the first readout control circuit 110 through the dual control circuit 114, the readout seizure circuit 116, and the playback control circuit 118. This causes the adapter recorder 102 to transmit the items of information comprising the first data entry or first toll call to the first data register 104 in which these items of information are stored and translated to provide the final items of information that are to be recorded on the first toll ticket produced by the output recorder 108. When the end-of-entry signal following the first data entry is received by the first readout control circuit 110, three separate operations are performed. The readout control circuit 110 removes the operating signal from the adapter recorder 102 so that the items of information forming the second data entry are not transmitted. The first readout control circuit 110 also forwards an enabling signal to the output recorder 108 so that this recorder is conditioned for operation under the control of the information stored in the first data register 104. The readout control circuit 110 also actuates the dual control circuit 114 so that the second readout control circuit 112 is rendered effective to control the forwarding of an operating signal through the readout seizure circuit 116 and the playback control circuit 118 to the seized adapter recorder 102.

This operation of the dual control circuit 114 also switches the data transmission path from the adapter recorder 102 to the input of the second data register 106. Thus, if this register has been reset, the second readout control circuit 112 forwards an operating signal to the adapter recorder 102 so that the second data entry comprising the items of information pertaining to the second toll call is transmitted to and stored in the second data register 106 during the recording of the first data entry by the output recorder 108. At the conclusion of the transmission of this second data entry, the end-of-entry signal is received by the detecting means in the second readout control circuit 112. When this signal is received, the operating signal from the circuit 112 for the adapter recorder 102 is removed to interrupt the transmission of the information therefrom. Further, the second readout control circuit 112 enables the output recorder 108 for operation under the control of the data stored in the second data register 106. The second readout control circuit 112 also actuates the dual control circuit 114 to its alternate condition.

In being operated to its alternate condition, the dual control circuit 114 transfers control over the adapter recorder 102 to the first readout control circuit 110 and also transfers the data transmitting path from the input of the second data register 106 to the input of the first data register 104. If this first register 104 has been reset under the control of the first readout control circuit 110 following the operation of the output recorder 108 to record the first data entry, the first readout control circuit 110 returns an operating signal to the adapter recorder 102 so that the third data entry comprising the items of information pertaining to the third toll call is transmitted to and stored in the first data register 104.

This alternate operation continues until the items of information stored on the magnetic tape in the adapter recorder 102 have been recorded by the output recorder 108. At this time, the playback control circuit 118 is advised that the data stored in the recorder 102 has been reproduced, and the switching means 124 is operated to seize the next adapter recorder 102. The information stored in this adapter recorder as well as the remaining recorders to which the playback control circuit 118 has access is played back to the output recorder 108 in the manner described above. At the completion of the playback of the information in the recorders associated with the playback control circuit 118, the readout seizure circuit 116 operates the switching means 122 so that the next playback control circuit 120 is seized, and the information available to this circuit is transmitted to and recorded by the output recorder 108. Following the completion of the recording of all of the items of information, the readout equipment is restored to a normal condition.

Referring now more specifically to FIGS. 2–7 of the drawings, FIGS. 2 and 3 disclose the details of the readout seizure circuit 116, FIG. 4 discloses the details of the dual control circuit 114, and FIGS. 5 and 6 disclose the details of the first readout control circuit 110. The first and second data registers 104 and 106, the second readout control circuit 112 and the output recorder 108 are illustrated in block form in FIG. 7 of the drawings. These circuits are of the type disclosed in the above identified United States patent. The first and second data registers 104 and 106 comprise electronic means for storing, translating and computing toll call data derived from the adapter recorders 102, and these registers are capable of storing and supplying such information as the designations of the calling and called subscribers, the date and time on which the call was placed, the duration of the call, and the monetary charge to be assessed, which charge is automatically computed in the data registers in accordance with duration and rate information supplied by the adapter recorders 102. The output recorder 108 can comprise any well known recording equipment, such as a card or tape punch or an electrically operated typewriter. The output recorder 108 is connected to and controlled by the data registers 104 and 106 in the manner shown and described in detail in the above identified patent.

The adapter recorders 102 (FIG. 2) can be any of the types well known in the art, but preferably comprise a magnetic tape recorder of the construction described in detail in United States Patent No. 2,867,435. As set forth therein, each of the adapter recorders 102 includes an endless loop of magnetic tape 240 and a pair of transducing heads 242 and 244 disposed adjacent transversely spaced portions of the tape 240 to define two longitudinally extending channels for receiving mark and space pulse information. Alphabetical and numerical information is stored on one of the channels under the control of the connected adapter circuit 100 by recording a number of pulses in the mark channel representative of the data items. Space or control pulses are recorded in the other channel for separating the successive mark pulses representing successive data items. Mark and space pulses are concurrently recorded in both of the channels to provide an end-of-call or end-of-data entry code or signal. The magnetic tape 240 is advanced relative to the transducing heads 242 and 244 by a signal responsive drive means 246 that is selectively energized under the control of the connected playback control circuit. The playback control circuits 118 and 120 are similar to the like identified circuit components shown in the first above identified patent.

The operation of the readout equipment can be initiated at a particular time of the day, manually, or in response to one of the adapter recorders 102 becoming filled with items of information. Assuming that the readout equipment is to be placed in operation at a particular time of day, a timing circuit applies a momentary ground signal to a terminal 248. This signal is forwarded through a pair of normally closed contacts 252 on a manually actuated switch to the lower operating winding of a two-step relay 340. This operates the relay 340 so that a pair of preliminary make contacts 341 are closed to connect ground from a pair of closed contacts 333 through the two windings of the relay 340 in series. Thus, when ground is removed from the terminal 248, the relay 340 operates fully to close a pair of contacts 342. The closure of the contacts 342 completes an operating circuit for a relay 330 which extends to ground through a plurality of pairs of normally closed contacts 239 and 305.

When the relay 330 operates, a plurality of contacts 334 and 335 are closed, and a plurality of contacts 331–333 are opened. The closure of the contacts 335 completes a holding circuit for the relay 330 extending to ground at the closed contacts 239. Thus, this relay remains operated when the opening of the contacts 333 releases the relay 340 to open the contacts 341 and 342. The opening of the contacts 331 and 332 disables the operating circuits for a relay 310 which is used when the readout equipment is placed in operation in response to a demand condition from the playback control circuit 118, such as that provided when one of the adapter recorders 102 becomes filled with information.

The closure of the contacts 334 connects the lower winding of a relay 320 to ground through a pair of normally closed contacts 224 so that the relay 320 operates to close a plurality of contacts 321–324. The closure of the contacts 322 completes a holding circuit for the lower winding of the relay 320 that is shunted around the closed contacts 334, and the closure of the contacts 321 completes a holding circuit for the upper winding of the relay 320. The closure of the contacts 323 forwards ground to the playback control circuit 118 to advise this circuit that the operation of the readout equipment has been normally initiated.

The closure of the contacts 324 forwards ground through a pair of normally closed contacts 441 on a switch 440 to the output recorder 108 so as to condition this recorder for operation. The ground provided at the closed contacts 324 is also forwarded through a pair of normally closed contacts 451 on a manually actuated switch 450 to the output recorder 108 to also condition this recorder for operation. The two parallel paths afforded by the contacts 441 and 451 are provided so that the output recorder can be conditioned for operation when either of the switches 440 and 450 is operated. These two switches are used to selectively render either one or the other of the first and second data registers 104 and 106 effective. The operation of the relay 320, by the closure of additional contacts (not shown), places various power supply circuits in operation so that the electronic components in the data registers 104 and 106 are conditioned for operation.

When the power supply for the data registers has reached an operative condition, a positive potential is applied to one terminal of the operating winding of a relay 630 in the first readout circuit 110, the other terminal of which is connected to ground at a pair of normally closed contacts 226 in the readout seizure circuit 116. This causes the operation of the relay 630 as an indication that power is supplied to the electronic components. In operating, the relay 630 closes a pair of contacts 631 to prepare a circuit for forwarding an operating signal to an adapter recorder 102.

When the output recorder 108 has been conditioned for operation, this recorder applies ground to a conductor 591 to complete an obvious operating circuit for a relay 610. In operating, the relay 610 closes a plurality of contacts 611, 612, 613 and 614. The closure of the contacts 613 forwards ground to the operating winding of a reset relay 520 so that this relay is operated to close a plurality of contacts 521 and 523 and to open a pair of contacts 522. The closure of the contacts 521 provides a holding circuit for the relay 520, and the closure of the contacts 523 completes an obvious operating circuit for a second reset relay 510. In operating, the relay 510 opens a plurality of contacts 512, 513 and 516 and closes a plurality of contacts 511, 514 and 515.

The closure of the contacts 511 forwards ground to the first data register 104 so that this register is cleared and restored to a normal condition to prepare it for receiving items of information from a seized adapter recorder 102. The closure of the contacts 515 completes an obvious operating circuit for an additional slow-to-operate reset relay 620. The operation of the relay 620 opens a plurality of contacts 621 and 624 and closes a plurality of contacts 622 and 623. The closure of the contacts 622 provides an additional source of reset ground for the first data register 104, and the closure of the contacts 623 provides a source of positive priming potential for the first data register 104 for placing certain electronic components therein in a normally conductive state. The opening of the contact 621 removes one source of holding ground from the winding of the first reset relay 520. Since the relay 620 is slow-to-operate, the closure of the contacts 623, for instance, is delayed for a long enough period to insure that the circuits in the first data register 104 have reached a stable reset state before the priming potential from the contacts 623 is forwarded.

Referring back to the above described operation of the relay 610, the closure of the contacts 612 completes an obvious operating circuit for a slow-to-operate relay 600. After its delay period, the relay 600 operates to close a plurality of contacts 601, 602, 603 and 605 and to open the contacts 604. The closure of the contacts 603 completes a holding circuit for the relay 600 extending to ground at a pair of normally closed contacts 227 in the readout seizure circuit 116. The closure of the contact 605 forwards ground to the readout seizure circuit 116 to complete an obvious operating circuit for a start relay 300 therein. The application of ground to the start relay 300 indicates that the first readout control circuit 110 and the first data register 104 have been conditioned for operation. The opening of the contacts 604 removes the last source of ground from the winding of the first reset relay 520 so that this relay and the relays 510 and 620 controlled thereby release to terminate the resetting operation.

When the reset relays are all restored to a normal condition, a circuit is prepared for forwarding an operating signal to the adapter recorder to be seized by the readout seizure circuit 116 and one of the playback control circuits 118. More specifically, ground from a pair of normally closed contacts 501 in an end-of-call or end-of-entry detector 500 is forwarded through the closed contacts 624, 513, 602 or 611 and 631 and a pair of normally closed contacts 416 on a control relay 410 in the dual control circuit 114 to a pair of normally open contacts 213 in the readout seizure circuit 116. Thus, when the conditioning of the first data register 104 and the first readout control circuit 110 for the initiation of a cycle of playback operation has been completed, ground is forwarded to the readout seizure circuit 116 from the first readout control circuit 110.

The second readout control circuit 112 is substantially identical to the first readout control circuit 110 and is placed in operation by the ground signal returned over a conductor similar to the conductor 591 in the control circuit 110 and by the application of a positive potential to a relay corresponding to the relay 630. Thus, the second data register 106 is reset to a normal condition in which it is capable of receiving items of information and upon completion of this resetting operation, a ground signal is provided by the second readout control circuit 112 which is forwarded to the normally open contacts 415 on the relay 410. In addition, the second readout control circuit 112 provides a ground signal that is forwarded to the operating winding of the start relay 300 in the common readout seizure circuit 116 to indicate the completion of the resetting operation in the second data register 106 and the second readout control circuit 112.

When a ground signal is applied to the operating winding of the start relay 300 by either the first readout control circuit 110 or the second readout control circuit 112, this relay is operated to open a plurality of contacts 301 and 305 and to close a plurality of contacts 302, 303, 304 and 306. The opening of the contacts 305 interrupts the holding circuit for the relay 330 so that this relay releases. The closure of the contacts 302 connects ground to one terminal of the winding of a relay 210. The other terminal of this winding is connected to ground by a wiper 231 of the stepping switch 122 in its normal position. This ground is also forwarded over a plurality of normally closed contacts 201 and 235 and the closed contacts 303 to the operating windings of a relay 200. This circuit operates the relay 200 so that a plurality of contacts 202 and 203 are closed and the contacts 201 are opened.

The closure of the contacts 202 provides an additional source of ground for operating the relay 200. The closure of the contacts 203 completes an operating circuit for a motor magnet 234 of the stepping switch 122. This circuit extends from ground through the closed contacts 304 and a pair of normally closed contacts 215. When the motor magnet 234 is operated, the contacts 235 are opened and the wiper 231 as well as a plurality of other wipers 232 and 233 in the stepping switch 122 are advanced a single step into engagement with the contacts forming the first stepping position. In this first stepping position, a circuit connected to the wiper 231 performs a test to determine the availability of the first playback control circuit 118. If this circuit is idle, an open circuit is connected to the wiper 231. Alternatively, if the playback control circuit 118 is busy, ground is applied to the wiper 231 by the circuit 118. If ground is applied to the wiper 231, this ground replaces the ground provided in the home position of the switch 122, and a circuit is prepared for advancing the stepping switch 122 to its next stepping position by causing the operation of the relay 200. However, assuming that the playback control circuit 118 is in an idle condition, the open circuit provided on the contact engaged by the wiper 231 permits the seizure of the playback control circuit 118 by the readout seizure circuit 116.

More specifically, when the contacts 235 are opened, the above described operating circuit for the relay 200 is opened so that this relay releases to close the contacts 201 and to open the contacts 202 and 203. The opening of the contacts 202 removes ground from the interrupted operating circuit for the relay 200. The opening of the contacts 203 interrupts the operating circuit for the motor magnet 234 so that this magnet releases to close the contacts 235. The closure of the contacts 201 connects the operating winding of the switch relay 210 to the wiper 231. This causes the performance of the busy test on the playback control circuit 118. If the circuit is in a busy condition, the ground applied to the wiper 231 provides a ground shunt around the winding of the relay 210 so that this relay can not operate. However, if the playback control circuit 118 is in an idle condition so that an open circuit is presented to the wiper 231, the closure of the contacts 201 completes an operating circuit for the relay 210 which extends from ground through the closed contacts 302, the winding of the relay 210, the closed contacts 201, 235 and 303 and the windings of the relay 200 to negative battery. The current flow through the relay 200 is not sufficient to operate this relay. Accordingly, only the relay 210 operates at this time to signify that the playback control circuit 118 is in an idle condition and can be seized.

When the wipers 231–233 advance from their normal position, a plurality of off-normal springs in the switch 122 are actuated. More specifically, when the switch 122 is operated to an off-normal position, a plurality of contacts 237 and 238 are closed and the contacts 239 are opened. The opening of the contacts 239 interrupts an additional point in the holding circuit for the relay 330. The closure of the contacts 238 provides a source of holding ground for the readout seizure circuit 116, and the closure of the contacts 236 connects a reset magnet 236 in the stepping switch or switching means 122 to the contacts 301 which are now in an open condition.

When the relay 210 is operated, a plurality of contacts 211, 213 and 214 are closed and the contacts 215 as well as a pair of normally closed contacts 212 are opened. The opening of the contacts 215 interrupts an additional point in the operating circuit for the motor magnet 234, and the closure of the contacts 211 forwards ground over a wiper 232 to the playback control circuit 118 to provide a ground signal for holding the playback control circuit 118 in a seized condition. The closure of the contacts 213 forwards the ground signal previously supplied thereto by the first readout control circuit 110 over the wiper 233 to the playback control circuit 118. This ground signal places the playback control circuit 118 in operation so that the switching means 124 controlled thereby searches for and seizes the first idle adapter circuit 100 and the adapter recorder 102 connected thereto. When an idle adapter recorder 102 is seized, the ground signal provided by the wiper 233 is forwarded to the drive means 246 in the seized adapter recorder 102 so that it is placed in operation to advance the magnetic tape 240 relative to the transducing heads 242 and 244. This initiates the transmission of the first data entry or the items of information pertaining to the first toll call to the first data register 104.

The outputs of the transducing heads 242 and 244 are suitably extended to the input of the dual control circuit 114. In the normal condition of this circuit, the outputs from the transducing heads in the seized adapter recorder are connected by a plurality of closed contacts 401, 403, 405 and 407 and the cable 490 to the first data register 104. Accordingly, the reproduced data and control signals forming the first data entry are transmitted through the dual control circuit 114 to the first data register 104. This received data is stored, translated, and placed in a form in which it is capable of controlling the operation of the recorder 108. Since permanent records of incomplete data entries or records of those toll calls for which complete information is not available are not to be produced, the first readout control circuit 110 and the first data register 104 include circuit means of the type described in detail in the first above identified patent for preventing the operation of the output recorder 108 when insufficient information is supplied. This circuit is shown schematically in the drawings as a manually actuated switch 540. When sufficient data has been received, the switch 540 is closed to operate a relay 530.

When the relay 530 operates, a plurality of contacts 531 and 533 are opened and a plurality of contacts 532 and 534 are closed. The closure of the contacts 534 completes a holding circuit for the relay 530 extending to ground through the closed contacts 614 and 516. The opening of the contacts 531 disconnects the end-of-entry detector 500 from the reset relay 520, and the closure of the contacts 532 connects this detector to a path for initiating the operation of the output recorder 108.

When the end-of-entry code or signal following the items of information forming the first data entry is reproduced from the magnetic record 240, this signal or code is supplied to the detector 500. This detector is identical to the end-of-call or COE detector described in detail in the above identified patent and is shown schematically in the drawings as three switches or contacts 501–503. In response to the receipt of the end-of-entry signal, the detector 500 automatically operates to perform a number of control functions which are represented by the opening of the contacts 501 and the closure of the contacts 502 and 503. The opening of the contacts 501 removes the ground signal applied to the drive means 246 in the seized adapter recorder 102. Thus, the magnetic tape 240 is no longer advanced and the transmission of additional information is arrested.

The closure of the contacts 503 forwards ground through the closed contacts 532 and 522 to the output recorder 108. This places the recorder 108 in operation to record the items of information forming the first data entry that are now stored in the first data register 104. The closure of the contacts 502 forwards ground through a plurality of normally closed contacts 533', 512' and 551' in the second readout control circuit 112 and the normally closed contacts 442 on the key or switch 440 to the lower operating winding of a relay 430 in the dual control circuit 114. This completes an operating circuit for the relay 430 so that the dual control circuit 114 switches the seized adapter recorder 102 from the first readout control circuit 110 and the first data register 104 to the second readout control circuit 112 and the second data register 106.

The operating circuit for the relay 430 includes three pairs of normally closed contacts 512', 533' and 551' which correspond to like identified contacts in the first readout control circuit 110. The contacts 512 on the reset relay 510 are held in an open condition until the resetting of the first data register 104 has been completed. Similarly, the contacts 533 are opened as soon as information for causing a recording operation has been received, and are maintained in an open condition until the readout relay 530 is released at the completion of the resetting operation. The contacts 551 and 551' are opened when an alarm condition is established in the related register and control circuit. Accordingly, the operating circuit for the relay 430 can not be completed in the interval between the time at which the second data register 106 receives sufficient information for causing a recording operation and the time at which the second data register 106 has been reset to a normal condition. Thus, the contacts 533' and 512' insure that the second data register 106 has been cleared before the dual control circuit 114 can be actuated to connect the seized adapter recorder 102 to the second data register 106 and the second readout control circuit 112. The contacts 551' prevent use of the register 106 if an alarm condition has been established therein.

When the relay 430 is operated, a plurality of contacts 431, 432 and 434 are closed and a pair of contacts 433 are opened. The closure of the contacts 434 completes a holding and operating circuit for the upper winding of the relay 430 extending to ground in the second readout control circuit 112 at a pair of contacts similar to the contacts 601 in the first readout control circuit 110. The opening of the contacts 433 interrupts a holding circuit for a relay 420 to insure that this relay is in a released condition. The closures of the contacts 431 and 432 complete obvious operating circuits for a pair of relays 400 and 410. The operation of the relay 400 opens the contacts 401, 403, 405 and 407 and closes a plurality of contacts 402, 404, 406 and 408. The opening of the contacts 401, 403, 405 and 407 disconnects the transducing heads 242 and 244 in the seized adapter recorder 102 from the input to the data register 104, and the closure of the contacts 402, 404, 406 and 408 connects these transducing heads to the input of the second data register 106.

The operation of the relay 410 opens a plurality of contacts 412 and 414 and the contacts 416 and closes a plurality of contacts 411, 413 and 415. The closure of the contacts 411 and 413 shunts the input to the first register 104, and the opening of the contacts 412 and 414 removes shunts from the signal inputs to the second data register 106. The opening of the contacts 416 disconnects the recorder control circuit in the first readout control circuit 110 from the wiper 233, and the concurrent closure of the contacts 415 connects the recorder control circuit in the second readout control circuit 112 to the wiper 233. Thus, the second readout control circuit 112 now controls the application of the operating signal to the drive means 246 in the adapter recorder 102. Accordingly, the first operating signal supplied to the dual control circuit 114 transfers the adapter recorder 102 from the first data register 104 to the second data register 106 and transfers control over the adapter recorder 102 from the first readout control circuit 110 to the second readout control circuit 112. Thus, the second readout control circuit 112 causes the storage of the second data entry in the second data register 106 during the same time interval in which the output recorder 108 is recording the first data entry previously stored in the first data register 104.

When the output recorder 108 completes the recording of the first data entry stored in the first data register 104, a ground signal is returned over a conductor 592 to operate the reset relays 520, 510 and 620. The sequential operation of these resetting relays clears and resets the first data register 104 and primes this register for receiving the third data entry comprising the items of information relating to the third toll call in the manner described above. In addition, when the reset relay 520 operates to open the contacts 522, the start signal supplied to the output recorder 108 is removed. When the reset relay 510 operates to open the contacts 516, the holding circuit for the readout relay 530 is opened so that this relay releases.

The circuits represented by the switches 501–503 and 540 are also restored in this resetting operation.

The closure of the contacts 501 again provides the ground operating signal that is to be forwarded to the drive means 246 in the seized adapter recorder. However, this circuit is interrupted at the open contacts 416, 513 and 624. The opening of the contacts 502 interrupts the above described operating circuit for the lower winding of the relay 430, but this relay remains operated over the holding circuit including the closed contacts 434 and 422 extending to the second readout control circuit 112. The opening of the contacts 503 merely interrupts an additional point in the circuit for supplying an operating signal to the output recorder 108.

When the resetting operation is completed, the output recorder 108 removes ground from the operating winding of the reset relay 520 so that this relay and the relays 510 and 620 restore in sequence. When the relays 510 and 620 are released, the closure of the contacts 624 and 513 forwards the ground signal provided at the closed contacts 501 to the open contacts 416 so as to condition the dual control circuit 114 for returning control over the seized adapter circuit 102 to the first readout control circuit 110. The release of the reset relay 510 and the previous release of the relay 530 in closing the contacts 512 and 533 indicate the completion of the resetting operation in the first readout control circuit 110 and the first data register 104 and prepare a circuit for operating the dual control circuit 114 to its normal state in which the first readout control circuit 110 and the first data register 104 are effective and the second readout control circuit 112 and the second data register 106 are ineffective.

Referring now to the operation of the second readout control circuit 112 and the second data register 104 during the storage of the second data entry in the register 106, a relay therein similar to the relay 530 is operated to open the contacts 533'. However, the relay 430 remains operated over its holding circuit. The operation of the relay corresponding to the relay 530 also prepares a circuit for operating the output recorder 108 to record the items of information stored in the second data register 106.

When the end-of-entry signal following the second data entry is received by the second readout control circuit 112, an end-of-entry detector in the circuit 112 operates to perform the same functions as the detector 500. Thus, the circuit 112 removes ground from the closed contacts 415 to again interrupt movement of the magnetic tape 240 in the seized adapter recorder 102. Further, ground is applied to the prepared path in the second readout control circuit 112 so that the output recorder 108 is rendered effective to initiate a cycle of operation during which the second data entry stored in the second data register 106 is recorded. The end-of-entry detector in the second readout control circuit 112 also closes a pair of contacts 502', which correspond to the contacts 502, to forward a ground signal to the circuit including the contacts 533, 512 and 551.

When the first data register 104 has been reset, the contacts 512 and 533 are closed, and an obvious operating circuit for the upper winding of the relay 420 is completed. When this relay operates, the contacts 422 are opened and a pair of contacts 421 are closed. The opening of the contacts 422 interrupts the holding circuit for the relay 430 so that this relay releases. In releasing, the relay 430 opens the contacts 431, 432 and 434 and closes the contacts 433. The opening of the contacts 431 and 432 releases the relays 400 and 410 so that the transducing heads 242 and 244 are connected to the input of the first data register 104 and are disconnected from the input of the second data register 106. The release of the relay 410 shunts the input of the second data register 106, removes the shunt from the input of the first data register 104, and restores control over the operation of the drive means 246 in the seized adapter recorder 102 to the first readout control circuit 110. The closure of the contacts 433 completes a holding circuit for the lower winding of the operated relay 420 which extends through the closed contacts 421, 433 and 601 to ground.

When the relay 410 releases to close the contacts 416, ground is again forwarded from the closed contacts 501 in the end-of-entry detector 500 in the first readout control circuit 110 to the drive means 246 in the adapter recorder 102. This causes the third entry to be transmitted to and stored in the first data register 104. During this data transmitting operation, the second entry previously stored in the second data register 106 is recorded by the output recorder 108. At the completion of this recording operation, the output recorder 108 supplies a reset signal to the second readout control circuit 112 so that the second data register 106 is cleared and reset. At the completion of this operation, the contacts 533' and 512' are closed to indicate the completion of the resetting of the second data register 106. Accordingly, when the end-of-entry code following the third data entry is received by the end-of-entry detector 500, the first readout control circuit 110 again initiates the operation of the output recorder 108 to record the third data entry stored in the first data register 104 and forwards a signal over the closed contacts 512' and 533' to again energize the lower winding of the relay 430 to operate this relay.

When this relay operates, the control over the adapter recorder 102 is returned to the second readout control circuit 112, and the output of the adapter recorder 102 is disconnected from the first data register 104 and is connected to the second data register 106. Further, when the relay 430 operates to open the contacts 433, the holding circuit for the relay 420 is released so that the contacts 422 are closed to prepare the holding circuit for the relay 430. During the ensuing period of time, the fourth data entry is transmitted to and stored in the second data register 106 while the third data entry is being recorded by the output recorder 108. This intermittent operation continues until all of the items of information stored in the seized adapter recorder 102 have been recorded in permanent form by the output recorder 108.

The playback control circuit 118, as described in detail in the first above identified patent, includes detecting means operated by the prolonged absence of transmitted data from the seized adapter recorder for advancing the stepping switch 124 to seize the next idle adapter circuit 100 and its connected adapter recorder 102. The readout seizure circuit 116, the dual control circuit 114, and the first and second readout control circuits 110 and 112 then operate to playback the data entries stored in the next seized adapter recorder 102 to the output recorder 108. This operation continues until all of the data stored in the adapter recorders 102 accessible to the playback control circuit 118 has been recorded. When the switching means 124 reaches its last position, the playback control circuit 118 restores to a normal condition and, in doing so, applies ground to the wiper 231 to provide a ground shunt around the winding of the relay 210. This releases the relay 210 so that the switching means 122 seizes the next playback control circuit 120.

The data stored in the adapter recorders 102 to which the second playback control circuit 120 has access is then reproduced and transmitted to the data registers 104 and 106 and recorded by the output recorder 108. The readout seizure circuit 116 then advances the switching means 122 to release the playback control circuit 120 and to seize the next playback control circuit. This operation continues until all of the adapter recorders to which the readout seizure circuit 116 has access have been played back. At this time, the wipers 231, 232 and 233 are advanced to the last stepping position. In this last stepping position, the contact engaged by the wiper 231 is vacant so that the relay 210 operates over the above described circuit to close the contacts 211, 213 and 214 and to open the contacts 212 and 215. When the contacts 213 are closed, the recorder operating signal provided by one of the first or second readout control circuits is forwarded over the wiper 233 to complete an obvious operating circuit for a relay 220. In operating, the relay 220 closes a pair of contacts 225 and opens the contacts 222–224 and 226–229.

The closure of the contacts 225 completes a holding circuit for the relay 220 extending to ground at the closed off-normal contacts 238. The opening of the contacts 222–224 and 226–229 removes holding ground from various circuit components in the readout seizure circuit 116 and the first and second readout control circuits 110 and 112 so that these circuits are at least partially restored to a normal condition. The opening of the contacts 223 and 224 releases the relay 320, and the opening of the contacts 226 and 227 releases the relays 600, 610 and 630. When the relay 600 or the corresponding relay in the second readout control circuit 112 is released, ground is removed from one or the other of the two relays 420 and 430 so that the dual control circuit 114 is restored to a normal condition in which all of the relays 400, 410, 420 and 430 are released.

The release of the relay 320 removes the conditioning signal from the output recorder 108 so that the relay 610 in the first readout control circuit 110 and the corresponding relay in the second readout control circuit 112 are released. When the relay 600 is released, the operating circuit for the start relay 300 is interrupted so that this relay releases. The release of the relay 300 releases the relay 210 and forwards ground through the closed off-normal contacts 237 to energize the reset magnet 236. The operation of the magnet 236 restores the wipers 231, 232 and 233 to their normal positions. When these wipers are restored to their normal or "home" positions, the off-normal contacts 237 and 238 are opened and the contacts 239 are closed. The opening of the contacts 237 interrupts the operating circuit for the reset magnet 236, and the opening of the contacts 238 removes holding ground from the relay 220 so that this relay restores to a normal condition. Thus, the readout seizure circuit 116, the dual control circuit 114, the first and second readout control circuits 110 and 112, and the first and second data registers 104 and 106 are restored to their normal conditions.

The data handling or automatic toll ticketing system also includes manually or automatically operated means for selectively rendering only a single one of the first and second data registers 104 and 106 and a single one of the first and second readout control circuits 110 and 112 effective. The manual control is provided by the switches 440 and 450. If only the first data register 104 and the first readout control circuit 110 are to be used, the switch 440 is operated to close a pair of contacts 443 and to open the contacts 441 and 442. The opening of the contacts 441 interrupts one of the paths for supplying an enabling ground signal to the output recorder 108, and the opening of the contacts 442 interrupts the above described operating circuit for the relay 430 so that this relay and the relays 400 and 410 can not be operated. Since these relays can not be operated, control over the seized adapter recorder 102 can be exercised only by the first readout control circuit 110, and the heads 242 and 244 are connected to only the first data register 104. The closure of the contacts 443 connects a pair of contacts 306 on the relay 300 to the upper operating winding of the relay 420 so that this relay remains operated during the operation of the readout equipment to close the contacts 421 and to open the contacts 422. The operation of the relay 420 insures that the relays 400, 410 and 430 can not be operated. Thus, when the switch 440 is operated only the first readout control circuit 110 and the first data register 104 can be used to control the playback of information from a seized adapter recorder.

Similarly, if only the second data register 106 and the second readout control circuit 112 are to be used in removing stored information from the adapter recorders 102, the switch 450 is operated to open the contacts 451 and 452 and to close a pair of contacts 453. The opening of the contacts 451 disables one of the paths for forwarding a conditioning ground to the output recorder 108, and the opening of the contacts 452 interrupts the operating circuit for the upper winding of the relay 420 so that this relay can not be operated. The closure of the contacts 453 forwards ground from the contacts 306 to the lower winding of the relay 430. This operates the relay 430 and the relays 400 and 410 controlled thereby so that the seized adapter recorders 102 can be controlled by only the second readout control circuit 112 and can be connected to only the second data register 106.

To provide a means for automatically rendering only a selected one of the first and second data registers 104 and 106 and the first and second readout control circuits 110 and 112 effective, each of the readout control circuits includes an alarm detector that supplies a ground signal whenever any one of a number of alarm conditions are encountered during the operation of the readout equipment. The first above identified patent discloses a variety of different alarm means for detecting certain failures in the recorder 108 and in the data registers 104 and 106. Assuming that an alarm condition is established in the first data register 104 or in the first readout control circuit 110 that renders these components incapable of controlling the operation of the recorder 108, an alarm detector 554 associated with these components forwards ground to a pair of normally open contacts 514 on the reset relay 510. When this relay is next operated to close the contacts 514, ground is forwarded to complete an operating circuit for an alarm relay 550.

In operating, the relay 550 opens the contacts 551 and closes a plurality of contacts 552 and 553. The closure of the contacts 553 forwards ground from a pair of normally closed contacts 555 on a manually actuated switch to the winding of the relay 550 to maintain this relay operated when the reset relay 510 is released. The closure of the contacts 552 forwards ground through the closed contacts 442 to complete the operating circuit for the lower winding of the relay 430. This causes the operation of the relays 430, 400 and 410 so that subsequent playback operations are controlled only by the second readout control circuit 112 and information can be supplied to only the input of the second data register 106. The opening of the contacts 551 disables the above described path for operating the relay 420. Thus, the first readout control circuit 110 and the first data register 104 are automatically disabled in response to the establishment of an alarm condition in either the first readout control circuit 110 or the first data register 104. When the alarm condition has been corrected, the switch is manually operated to open the contacts 555 so as to release the relay 550. This restores the first readout control circuit 110 and the first data register 104 to an effective condition.

The second readout control circuit 112 includes an alarm detector similar to the unit 554 and an alarm relay similar to the alarm relay 550 so that the second data register 106 and the second readout control circuit 112 can be rendered ineffective when an improper condition arises in these circuits. The alarm detector in the second readout control circuit 112 includes means for opening the contacts 551' to disable the circuit for operating the relay 430 and additional contact means for maintaining the relay 420 in operation so that the seized adapter recorder 102 is connected to only the first readout control circuit 110 and the first data register 104.

As indicated above, the readout seizure circuit 116 includes means for automatically placing the readout equipment in operation whenever any one of the adapter recorders 102 to which any of the playback control circuits 118 and 120 have access becomes filled with items of information. When this condition is established, it is necessary to immediately playback the adapter recorder because a filled adapted recorder takes the connected adapter or trunk circuit out of service and reduces the traffic handling capacity of the system. Whenever one of the adapter recorders 102 is placed in a filled condition, the playback control circuit associated therewith, such as the circuit 118, is operated to supply an open circuit to only its own related contact in the bank engaged by the wiper 231 of the switching means 122 and to apply ground to all of the other contacts engaged by the wiper 231. Thus, only the playback control circuit having access to the filled adapted recorder can be seized. The playback control circuit 118 also forwards ground through a pair of normally closed contacts 253, the wiper 232, and the contacts 212, 221, 312 and 331 to energize the upper winding of an emergency playback relay 310.

The relay 310 operates to close a plurality of contacts 311, 313, 314 and 315 and to open the contacts 312. The closure of the contacts 313 prepares a holding circuit for a lower winding of the relay 310 extending between ground and positive potential over the closed contacts 223, 313 and 332. This holding circuit does not become effective until such time as the power supply circuit for the readout equipment is placed in an operative condition to supply a positive potential to all of the electronic components. The contacts 311 and 312 provide a make-before-break contact arrangement so that the closure of the contacts 311 prior to the opening of the contacts 312 completes a holding circuit for the upper winding of the relay 310 that is immediately effective over the closed contacts 222, 311 and 331. The closure of the contacts 314 forwards ground to the playback control circuit 118 to advise the playback control circuit 118 that an emergency rather than a normal cycle of operation has been initiated.

The closure of the contacts 315 forwards ground over the path also controlled by the contacts 324 so as to perform the functions described in detail above. In general, this comprises resetting the first and second data registers 104 and 106 and the first and second readout control circuits 110 and 112 and conditioning the power supply circuits and the output recorder 108 for operation. When the circuit components have been reset and conditioned for operation, ground is again returned to the operating winding of the start relay 300 so that this relay operates. The operation of the start relay again places the switching means 122 in operation so that the readout seizure circuit 116 searches for an idle playback control circuit. Since the emergency playback condition marks all of the playback control circuits other than the circuit 118 as busy, the switching means 102 seizes only the playback control circuit 118. In response to seizure, the circuit 118 then seizes only the filled adapter recorder 102 so that the items of information are played back in the manner described above. At the conclusion of this playback operation, the switching means 122 is returned to its normal position without seizing any further adapter recorders, and the readout equipment is restored to a normal condition. At this time, the emergency playback relay 310 is released by the operation of the relay 220.

In addition, the readout seizure circuit 116 and the readout equipment can be placed in operation under manual control. To do this, a pair of keys are operated. A first non-locking key is actuated to momentarily close a pair of contacts 251. This supplies ground to the lower winding of the two-step relay 340 so that this relay is operated to place the readout seizure circuit 116 in operation in the manner described above when a momentary ground pulse is applied to the terminal 248 under the control of the timing circuit. The second locking key is also actuated to open the contacts 252, 253 and 254 and to close a pair of contacts 255. The opening of the contacts 252 disconnects the terminal 248 from the relay 340 so that a timed start pulse can not be applied to the circuit 116 after its operation has been initiated by the actuation of the key to momentarily close the contacts 251. The opening of the contacts 253 interrupts the above described circuit for placing the readout seizure circuit 116 in operation in response to the establishment of an emergency start condition. The closure of the contacts 255 illuminates a lamp 256 to indicate that the circuit 116 is being manually controlled. The opening of the contacts 254 terminates the normal illumination of the lamp 257 which is used to indicate that the circuit 116 is conditioned for automatic control. At the completion of the manually initiated playback operation, the locking key is restored to its normal condition so that the contacts 252–254 are again closed and the contacts 255 are opened.

Although the present invention has been described with reference to a single embodiment thereof, it will be understood that those skilled in the art can make many other modifications and embodiments that will fall within the spirit and scope of this invention.

What is claimed as new and desired to be secured by Letters Patent of the United States is:

A data handling system comprising a data source for supplying successive data entry representing signals each including an end-of-entry signal, said data source being rendered effective to transmit said signals in response to the receipt of an operating signal, a plurality of data registers each adapted to store a data entry under the control of the signals transmitted by said data source, data utilizing means connected to all of said plurality of data registers, first control means connected to each of said data registers for supplying said operating signal to said data source, one of said first control means being effective to supply an operating signal to said data source so that a data entry representing signal is supplied to one of the data registers, means for resetting said data registers, second control means connected to each of said data registers for indicating that the connected data register has been reset, third control means connected to each of said data registers and responsive to said end-of-entry signals, means operated by the third control means connected to said one data register for rendering the first control means connected to said one data register ineffective, means controlled by the third control means connected to said one data register and including the second control means connected to another data register for operating the first control means in said another data register, and means controlled by the third control means connected to said one data register for rendering said one data register effective to control said data utilizing means in accordance with the data entry stored in said one data register.

References Cited in the file of this patent

UNITED STATES PATENTS

| | | |
|---|---|---|
| 2,636,672 | Hamilton et al. | Apr. 28, 1953 |
| 2,787,416 | Hansen | Apr. 2, 1957 |
| 2,913,705 | Cox et al. | Nov. 17, 1959 |
| 2,930,028 | Johnson et al. | Mar. 22, 1960 |

OTHER REFERENCES

Publication: A Numerically Controlled Milling Machine, by Servomechanism Laboratory, Massachusetts Institute of Technology, 1953 (pages 128–129 are of interest).